E. J. LARSON.
SAFETY LOGGING HOOK.
APPLICATION FILED MAY 4, 1912.
1,045,568.
Patented Nov. 26, 1912.
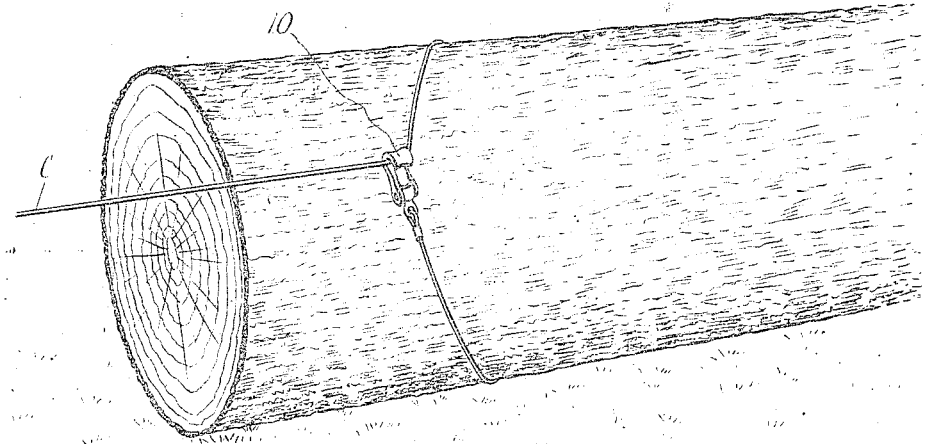
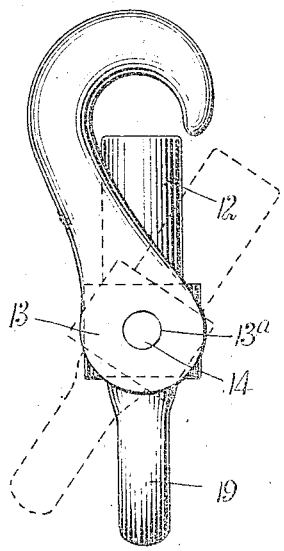
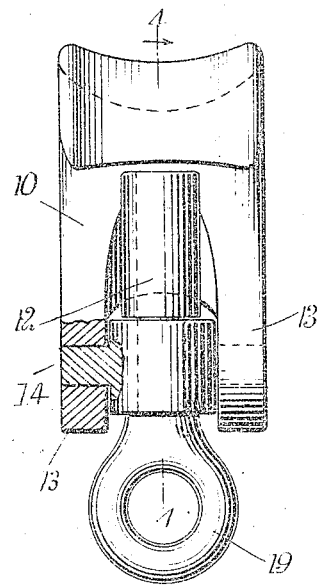
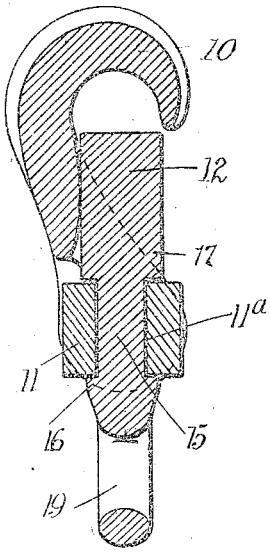
WITNESSES
INVENTOR
Ernest J. Larson
BY
ATTORNEYS

UNITED STATES PATENT OFFICE.

ERNEST JOEL LARSON, OF MARSHFIELD, OREGON.

SAFETY LOGGING-HOOK.

1,045,568.

Specification of Letters Patent.

Patented Nov. 26, 1912.

Application filed May 4, 1912. Serial No. 695,172.

*To all whom it may concern:*

Be it known that I, ERNEST J. LARSON, a citizen of the United States, and a resident of Marshfield, in the county of Coos and State of Oregon, have invented a new and Improved Safety Logging-Hook, of which the following is a full, clear, and exact description.

This invention relates to hoisting block and tackle, and has particular reference to an improved hook adapted especially for use in connection with a draft cable, such for instance, as is used in logging camps or like places where heavy objects are being drawn by distant power.

The invention specifically covers certain details of construction embodying elements of cheapness, maximum strength and highest efficiency and safety during operation, all as will be hereinafter fully described and claimed and illustrated in the accompanying drawings, in which—

Figure 1 is a perspective view showing the device in operative position; Fig. 2 is a side view of the hook complete, dotted lines showing certain parts in abnormal position; Fig. 3 is an outside face view of the same; and Fig. 4 is a vertical central transverse section substantially on the line 4—4 of Fig. 3.

The device constituting the subject of this invention comprises essentially three parts, the hook proper or body portion 10, a knuckle 11, and a tongue member 12.

The body portion 10 is shown of considerable width with respect to its thickness and it is provided at the end opposite the point of the hook with a pair of spaced parallel ears 13 having alined holes or sockets 13ª preferably provided with smooth surfaces.

The knuckle 11 may be of any suitable form and is pivoted between said ears 13 on a pair of studs 14 journaled into the aforesaid holes 13ª and formed integral with the sides of the knuckle, whereby the knuckle is adapted to turn in a plane transverse to the axis of the studs 14. The knuckle is also provided with a central cylindrical bore 11ª.

The third member 12 of the device comprises a shank 15 journaled in the knuckle bore 11ª, said shank having a shoulder 16 on one side of the knuckle and is secured in the knuckle by any suitable means, as for instance, by means of a cylindrical enlargement 17 formed upon the opposite end of the shank constituting a tongue adapted to lie normally within and close the mouth of the hook and prevent accidental separation therefrom of the draft cable C during operation, irrespective of the rotation of the tongue member in the bore of the knuckle 11.

With the cable C attached as indicated it may be passed around a log or other object to be drawn, and by swinging the tongue on the axes of the studs 14 outward from the mouth of the hook or beyond the point thereof, as indicated in dotted lines in Fig. 2, the cable may be slipped into the hook and upon allowing the tongue to assume the normal position indicated there is no possibility for the cable to be accidentally detached from the hook because the body portion 10, being very broad, will prevent the device from rolling, and hence the tongue will be prevented, by contact of the eye 19 and cable attached thereto with the log, from swinging outward from normal locking position so long as draft is maintained upon the cable. These devices are, of course, subjected naturally to exceedingly rough usage and it is important not only that the foregoing operation shall be relied upon, but also that the device shall be as compact as possible so as to avoid the obstructions that are continually being met with in practice.

The several parts of this hook may be made of any materials found best suited for the purpose, and the details of construction may be varied to a certain extent within the spirit of the invention hereinafter claimed.

As one convenient manner of manufacturing this hook the body portion is forged of a single piece of metal and the ears 13 are punched to form the smooth bearing holes 13ª. The knuckle likewise is preferably made of one piece of metal with the trunnions 14 formed integral therewith. If the ears 13 be bent away from each other during the formation of the body portion, the knuckle may be put into place with one trunnion in its ear, and then the opposite ear bent into place embracing the opposite trunnion. The tongue member likewise is preferably made of one piece of metal, the enlargement 17 being formed thereon, leaving the shank 15 of sufficient length to be upset after passing through the bore 11ª, forming the shoulder 16 and being adapted to have the eye 19 punched therethrough.

The tongue member and knuckle members may be assembled either before or after the knuckle is mounted in the body member.

Having thus described my invention, what I claim as new and desire to secure by Letters Patent is:

In a safety logging hook, the combination of a broad body member constituting the hook proper, said body member having a pair of spaced parallel ears having alined holes, a knuckle between said ears, means coöperating with said holes and extending from the opposite sides of said knuckle whereby it is pivoted to swing in a plane transverse to the axis of said holes, and a tongue member pivoted in and extending through the bore of said knuckle at right angles to the axis of said holes, and pivot means, said tongue member having an attachment eye at one end and an enlarged integral cylindrical extension at the other end adapted to lie normally within and substantially close the mouth of the hook.

In testimony whereof I have signed my name to this specification in the presence of two subscribing witnesses.

ERNEST JOEL LARSON

Witnesses:
  AUGUST FRIZEEN,
  ARTHUR REYNOLDS.